Nov. 30, 1948.   L. LEE, II   2,455,308
CONTROL APPARATUS FOR INTERNAL-COMBUSTION ENGINES
Filed Sept. 24, 1945   3 Sheets-Sheet 1

INVENTOR.
LEIGHTON LEE II
BY
AGENT

Nov. 30, 1948.   L. LEE, II   2,455,308
CONTROL APPARATUS FOR INTERNAL-COMBUSTION ENGINES
Filed Sept. 24, 1945   3 Sheets-Sheet 2

INVENTOR.
LEIGHTON LEE II
BY
Lester W Clark
AGENT

Nov. 30, 1948. L. LEE, II 2,455,308
CONTROL APPARATUS FOR INTERNAL-COMBUSTION ENGINES
Filed Sept. 24, 1945 3 Sheets-Sheet 3

INVENTOR.
LEIGHTON LEE II
BY
AGENT

Patented Nov. 30, 1948

2,455,308

UNITED STATES PATENT OFFICE 2,455,308

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application September 24, 1945, Serial No. 618,309

19 Claims. (Cl. 123—119)

This invention relates to apparatus for controlling the supply of fuel to an internal combustion engine.

Fuel supply systems for internal combustion engines may, generally speaking, be classified either as carburetor type systems, in which the fuel is mixed with the air in the air induction system of the engine, after which the mixture is distributed through the intake manifold to the cylinders; or as distributor type systems, wherein the fuel charge for the engine is broken up by a fuel distributor mechanism into small charges for the individual cylinders, and these charges are conveyed to the cylinders by suitable conduits. In distributor type systems, the fuel may be fed directly into the cylinders, or it may be fed to separate spray nozzles, one for each cylinder, which are located in the intake manifold adjacent the intake valves of the cylinders.

An object of the present invention is the provision of a novel fuel supply system for an internal combustion engine including improved means for controlling the flow of fuel to the engine and applicable either to carburetor or distributor type systems.

Another object is the provision of novel means of particularly simple construction for effectively controlling the supply of fuel, in either a distributor or carburetor type system, in response to both the rate of fuel flow and the rate of airflow to the engine, so that a substantially constant ratio of fuel to air may be maintained.

The invention further provides an especially simple and effective distributor type fuel supply system wherein a distributor piston is subjected on opposite faces to a fuel differential pressure corresponding to the rate of fuel flow.

Another feature of the invention resides in a fuel supply system of the carburetor type wherein a piston for controlling the flow of fuel to an air induction system is subjected on opposite faces to a fuel differential pressure corresponding to the rate of fuel flow.

Other features of the invention will be hereinafter described and claimed.

Figure 1:
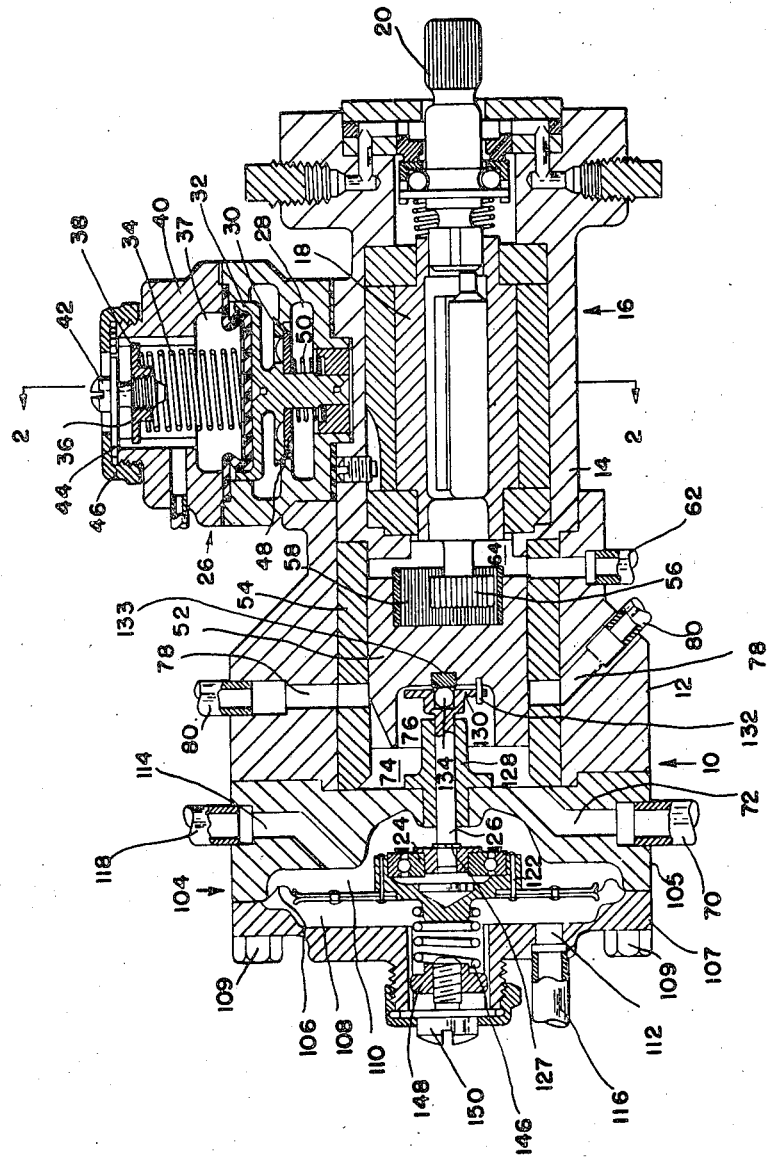
Fig. 1 is a view in longitudinal vertical section illustrating a combined rotary pump and fuel distributor valve mechanism embodying features of my invention.

Referring to the drawings, there is shown in Fig. 1 a fuel distributor 10 including a housing 12 united in any suitable manner to the housing 14 of a pump 16 of generally conventional design. Conveniently the pump housing 14 may be press-fitted within an end portion of the distributor housing 12, though it will be apparent that said housings may be fastened together by bolts, if desired, or even made integral.

The pump 16 comprises a rotor 18 driven by a shaft 20 which is splined at its end so that it may be readily driven through a suitable connection from the engine. Fuel is received by the pump through an inlet connection 22 (Fig. 2) and is discharged through an outlet 24.

The pump discharge pressure is regulated by a relief valve generally indicated at 26. Fluid at the pump discharge pressure flows into a relief passage 28, where it acts upwardly on the under side of a valve 30. The upper surface of said valve is attached to a guide 32 which is acted upon by a spring 34, so that said guide and said valve 30 are biased in a valve-closing direction. The upper end of spring 34 acts against a retainer nut 36, which is held against rotation by diametrically opposite projections 38, slidable in grooves in the valve cover 40. The nut 36 is vertically adjustable to vary the spring tension by means of a screw 42 on which the nut 36 is threaded. The screw 42 is provided with a flange 44 which may be clamped between the valve cover 40 and a locking cap 46 to hold the nut 36 in any adjusted position. The valve 30 and guide 32 are balanced against pump inlet pressure.

A by-pass valve 48 is provided in the form of a thin disk biased upwardly against the under side of valve 30 by a spring 50. The disk valve 48 closes apertures in the valve 30. If for any reason the pump inlet pressure becomes greater than the discharge pressure, the valve 48 opens, allowing fluid to by-pass the pump. This arrangement is useful when two pumps are connected in series in a fluid line. If one pump fails to operate for some reason, the by-pass valve on that pump opens to allow the other pump to move fuel past it.

If the pump discharge pressure tends to increase above the value established by the force of spring 34, the relief valve 30 opens, allowing part of the fuel discharged to return to the pump inlet. The valve continues to open wider until the pump discharge pressure is reduced to a value which just balances the force of the spring 34. Therefore, the pump discharge pressure is held at a substantially constant value.

The opposite end of rotor 18 is drivingly connected to a distributor piston 52, which is mounted for both rotary and translatory motion in a bearing 54 in the housing 12. The driving connection between the rotor 18 and piston 52 may take any suitable form for effecting rotation of said piston while at the same time permitting translation thereof. Conveniently said connection may, as shown, comprise a pinion 56 on the rotor 18 meshing with an internal gear 58 on the piston 52, the teeth of said internal gear being of sufficient length to permit translation of the piston throughout its maximum range without disengagement of said gear 58 from the pinion 56. The piston may thus be continuously rotated with the pump rotor 18, while also being movable longitudinally in the sleeve 54.

Figure 2:
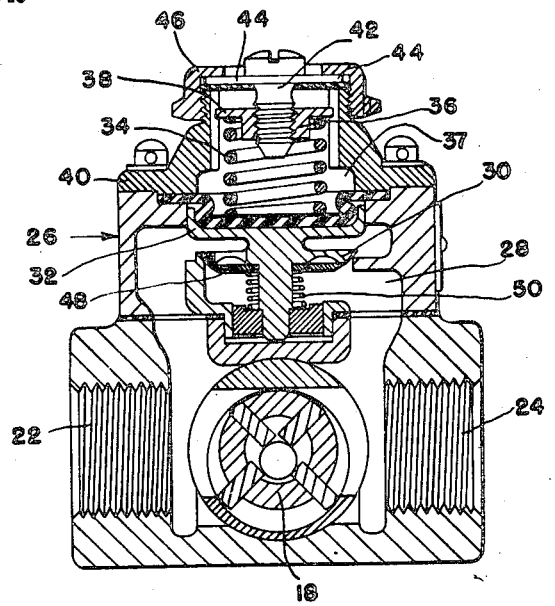
Fig. 2 is a cross-sectional view taken on line 2—2 of Fig. 1.
Figure 3:
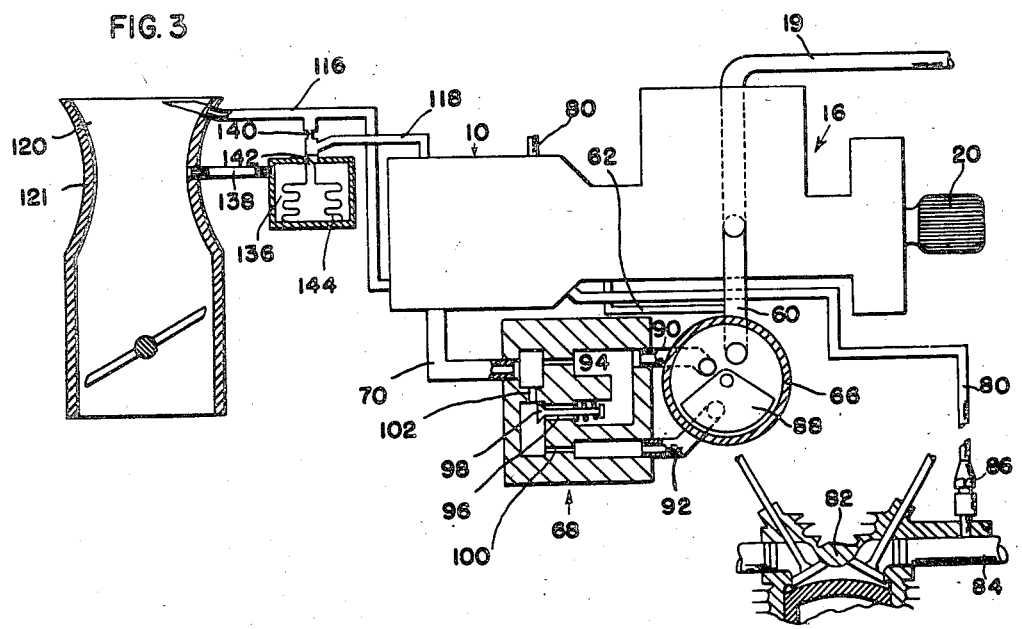
Fig. 3 illustrates diagrammatically a fuel supply system for an internal combustion engine embodying the principles of my invention and including a distributor mechanism of the type shown in Fig. 1.

Rotation of the pump rotor 18 draws fuel from a suitable tank or reservoir through a conduit 19 (Fig. 3) and inlet opening 22 (Fig. 2) and impels said fuel through discharge opening 24 into a conduit 60 (Fig. 3). From said conduit 60, the fuel may pass through a mixture control valve 66 (Fig. 3) and a jet system 68 through a conduit 70, and thence through a passage 72 into a chamber 74 (Fig. 1) at the left of the piston 52.

A conduit 62 communicates with the fuel conduit 60 and also with a chamber 64 at the right of the piston 52, so that said piston is subjected at its right hand end (Fig. 1) to the pressure of the fuel in said conduit 60.

Said piston 52 is slotted, as indicated at 76, to provide communication between the fuel-containing chamber 74 at its lefthand end and a plurality of circumferentially spaced ports 78. The latter extend through the bearing sleeve 54 and housing 12 and are connected by conduits 80 to the respective cylinders of the engine. Thus, as said piston rotates, said circumferentially spaced ports are brought successively into communication with the fuel-containing chamber 74.

Each of the conduits 80 may be connected to a corresponding one of a plurality of discharge or injector nozzles in a corresponding cylinder of the engine or in the air intake passage thereof. The head of one such cylinder is indicated diagrammatically at 82 in Fig. 3, the fuel intake passage of the cylinder at 84, and the injector nozzle at 86. The latter may be of any suitable or well-known type. If desired, said nozzles may take the form illustrated in either Fig. 4 or Fig. 5 of my copending application, Serial No. 584,867, filed March 26, 1945.

The mixture control 66 above referred to includes a disc valve 88, which when in the position shown in the drawing (termed the lean position), permits fuel from the conduit 64 to flow only through conduit 90 to the jet system 68. However, said disc valve 88 is movable from the position shown to one (termed the rich position) in which the fuel from conduit 64 may flow to the jet system through both conduit 90 and conduit 92, as is well understood in the art.

Fuel entering the jet system 68 through the conduit 90 passes either through a fixed restriction 94 or through a restriction 96 controlled by an enrichment valve 98 biased to closed position by a spring. Fuel flowing to said jet system through conduit 92 passes through a fixed restriction 100. Fuel flowing through the restrictions 96 and 100 also flows through a restriction 102 before entering the conduit 70.

It has been noted that the distributor piston 52 is subjected at its righthand end to the pressure of the fuel supplied to the jet system 68 and at its lefthand end to the pressure of the fuel which has passed through said jet system. In other words, the piston 52 is subjected to the fuel pressure differential across the jet system 68, which pressure differential is a measure of the fuel flowing to the engine per unit of time.

Suitably secured to the forward or lefthand end of the distributor housing 12 is a casing 104 comprising sections 105, 107 united by bolts 109, which may conveniently extend into the housing 12. Fastened at its periphery between the casing sections 105, 107 is a flexible diaphragm 106, separating said casing 104 into a pair of chambers 108 and 110. Port 112 in chamber 108 is connected by conduit 116 to the entrance of a passage 120 (Fig. 3) for the flow of air to the engine. A secondary air passage may be traced from the entrance 120 thru a conduit 116, a restriction 190, past a valve 142, thru a chamber 136 and a conduit 138 to the throat of venturi 121. Port 114 in chamber 110 is connected through a conduit 118 to a point in the secondary air passage between restriction 140 and valve 142. The valve 142 is positioned by a bellows 144 in the chamber 136. The function of said valve 142 and bellows 144 is to reduce the total pressure differential produced by the venturi 10 by an amount sufficient to correct for decrease in density of the air due to altitude or temperature, so that the pressure drop appearing across the restriction 140 is a measure of the mass of air flowing through the venturi 121 per unit of time. Since the pressure drop across the restriction 140 is applied to the diaphragm 106, it will be apparent that said diaphragm is subjected to a force which is a measure of the rate of said mass air flow.

The diaphragm 106 is connected to the piston 52 by any suitable means whereby movement of the diaphragm in either direction is imparted to said piston, without interfering with continuous rotation of the piston. One such means which may be employed to advantage is illustrated in Fig. 1, wherein a recessed member 122 passes through the center of the diaphragm and is pinned or otherwise suitably secured thereto. Mounted near one end in a bearing 124 in said member 122 is a shaft 126 which throughout the greater portion of its length extends through a bearing sleeve 128 in a wall of the casing 104. Near the aforementioned end, said shaft 126 carries a split ring washer 127 which abuts a part of the bearing 124, so that movement of the diaphragm 106 to the right (Fig. 1) is transmitted to said shaft. At its other end said shaft 126 is provided with a recessed head 130 having one or more fingers engaging openings or slots in lugs on the piston 52, one of which lugs is shown at 132, so that said shaft 126 rotates with said piston and also transmits longitudinal movement thereto in response to movement of the diaphram 106. A ball 134 may, as shown, be mounted in a recess in said head 130 to provide an anti-friction thrust bearing between said shaft 126 and the piston 52. A hardened steel thrust plate 133 may be inserted in the piston 52, if desired, to take the thrust of the ball 134.

In the operation of the apparatus shown in Fig. 1, the differential pressure corresponding to the mass air flow per unit of time urges the diaphragm 106 and piston 52 to the right, thereby to increase the opening of the ports 78. On the other hand, the fuel pressure differential across the jet system 68, which differential is a measure of the rate of fuel flow to the engine, acts upon the piston 52 to urge the latter to the left, or in the direction for closing said ports 78. If the rate of air flow rises, the differential pressure in the chambers 108 and 110 becomes greater and shifts the piston 52 to increase the opening of the ports 78, which consequent increased fuel flow to the engine. The fuel differential pressure acting upon said piston thus becomes greater, so that said piston is moved to the right by the air differential pressure only until it reaches a position wherein the force exerted on the piston by said increased fuel differential pressure balances the force exerted on said piston by the aforementioned increased air differential pressure. The piston 52 remains in this position of balance until the rate of mass air flow again changes. For instance, if said air flow decreases, the fuel-pressure differential moves the piston 52 further toward port-closing position, until the consequent decreased fuel-pressure differential balances the diminished air-pressure differential.

It will thus be apparent that, through the apparatus above described, there is maintained a substantially constant ratio between the fuel flow and the air flow. This ratio may, of course, be varied by operation of the mixture control valve 88.

If desired, a spring 146 may be provided for urging the diaphragm to the right in Fig. 1 to insure that the notch 76 in said piston will register slightly with the successive ports 78 as the piston rotates, so that said ports are slightly opened when no air is flowing through the venturi 120. When the air differential pressure is very small, as for low rates of air flow corresponding to idling positions of the throttle, this spring 146 insures that the piston 52 moves to the right until the ports 78 are opened sufficiently so that the fuel pressure differential across the jet system balances the force of the spring. The spring therefore establishes the minimum rate of fuel flow under idle conditions.

The pressure of spring 146 on the diaphragm 106 may be adjusted as desired by nut 148 and screw 150, in the same manner that the pressure of spring 34 is varied through manipulation of screw 42 and nut 38.

Throughout the operation of the engine the piston is rotated continuously with the result that not only are the ports 78 opened in succession, but furthermore, static friction between said piston and the bearing sleeve 54 is eliminated. Said piston is thus enabled to respond with marked accuracy and precision to slight changes in the air and fuel pressure differentials. The piston is, of course, rotated at one-half crankshaft speed on a four-stroke cycle engine, so as to time the fuel delivery to the cylinders concurrently with the intake strokes of the various pistons. The modification shown in Figs. 4 and 5 embodies the same construction as Figs. 1 and 2 with the following exceptions.

The ports 78 of Figs. 1 and 2 are replaced by a single annular recess 152 extending around the interior of the housing 12. All the ports in the bearing sleeve 54 open into said recess 152. The piston 158 is much the same as piston 52 except that in piston 158 the notch 76 of piston 52 is omitted. Thus said piston 158 acts as a valve to increase or decrease the extent of communication between recess 152 and the fuel-containing chamber 74 to the left of said piston as the latter shifts longitudinally to different positions.

Communicating with said recess 152 is a conduit 160 through which fuel from said recess passes to a fuel discharge nozzle 162 (Fig. 5) in the air passage 120.

The face of piston 158 toward chamber 74 is dished to provide a knife edge 159 at its periphery. A sharp edge at this point aids greatly in preventing the pressure in conduit 160 from affecting the pressure in chamber 74.

Figure 4:
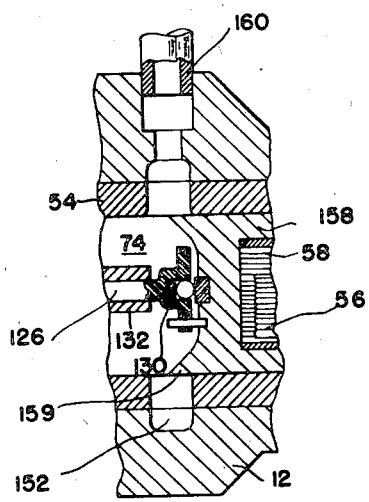
Fig. 4 illustrates a modified form of the invention, wherein the piston acts not as a distributor, as in Fig. 1, but as a simple fuel control valve.
Figure 5:
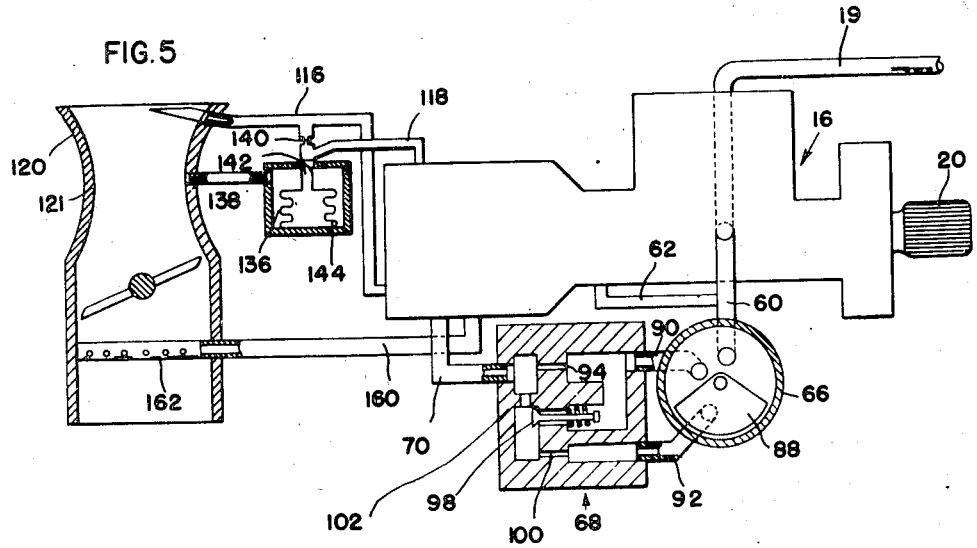
Fig. 5 illustrates diagrammatically a fuel supply system embodying the principles of my invention including a fuel control valve of the type shown in Fig. 4.

Other than as above described the parts of the embodiment shown in Figs. 4 and 5 are the same as those in Figures 1–3. Corresponding parts in the two embodiments are designated by the same reference numerals.

Since the piston 158, like piston 52, is subjected to the fuel pressure differential across the jet system 68 (which, as above noted, is a measure of the rate of fuel flow to the engine) and is also movable through shaft 126 by a diaphragm subjected to the differential pressure corresponding to the mass air flow per unit of time, said piston assumes a position of balance between the forces exerted thereon by said differential pressure and varies the opening of the recess 152 correspondingly. If, for example, the rate of air flow increases, the piston 158 shifts to the right, increasing the fuel flow through the nozzle 162 to the engine. This increased fuel flow is accompanied by an increased differential pressure across the jet system 68. The movement of piston 158 to the right continues until the force exerted on said piston by said increased fuel differential pressure balances that exerted on said piston by said increased air differential pressure. On the other hand, should the mass air flow decrease, the fuel-pressure differential moves the piston 158 further to the left, decreasing the opening between chamber 74 and recess 152, until the decreased fuel-pressure differential balances the decreased air-pressure differential.

Although the embodiments herein described are adapted for use with a reciprocating internal combustion engine, it should be realized that my invention is readily applicable to turbine or jet type internal combustion engines.

While I have shown and described certain preferred embodiments of my invention, other modifications thereof will readily occur to those skilled in the art, and I therefore intend my invention to be limited only by the appended claims.

I claim as my invention:

1. A fuel control system for an internal combustion engine comprising a control cylinder, a piston rotatable in said cylinder and separating two chambers between the ends of said piston and the ends of said cylinder, one of said chambers having a fuel inlet port and also having a plurality of ports in a wall of said cylinder for the discharge of fuel to the respective cylinders of the engine, said piston having a channel portion providing communication between said inlet port and the respective discharge ports during rotation of said piston, said piston being also translatable in said cylinder to vary the opening of said discharge ports, rotation of said piston being also effective to prevent sticking thereof during translation, restricted passage means for the flow of fuel to said inlet port, and means for admitting fuel to the other of said chambers from a point upstream of said restriction, whereby said piston is subjected on opposite faces to a differential pressure of fuel flowing to the engine.

2. A fuel control system for an internal combustion engine comprising a control cylinder, a piston rotatable in said cylinder and separating two chambers between the ends of said piston and the ends of said cylinder, one of said chambers having a fuel inlet port and also having a plurality of ports in a wall of said cylinder for the discharge of fuel to the respective cylinders of the engine, said piston having a channel portion providing communication between said inlet port and the respective discharge ports during rotation of said piston, said piston being also translatable in said cylinder to vary the opening of said discharge ports, rotation of said piston being also effective to prevent sticking thereof during translation, restricted passage means for the flow of fuel to said inlet port, means for admitting fuel to the other of said chambers from a point upstream of said restriction, whereby said piston is subjected on opposite faces to the differential pressure of fuel flowing to the engine, and means connected to said piston and subject to the differential pressure of air flowing to the engine.

3. A fuel control system for an internal combustion engine comprising a control cylinder, a piston rotatable in said cylinder and separating two chambers between the ends of said piston and the ends of said cylinder, one of said chambers having a fuel inlet port and also having a plurality of ports in a wall of said cylinder for the discharge of fuel to the respective cylinders of the engine, said piston having a channel portion providing communication between said inlet port and the respective discharge ports during rotation of said piston, said piston also being translatable in said cylinder to vary the opening of said discharge ports, rotation of said piston being also effective to prevent stocking thereof during translation, fuel supply means comprising a pump having a rotor, means connecting said pump rotor with said piston for imparting rotation to the latter, restricted passage means connected to said pump for supplying fuel to said inlet port, and means connected to said passage means upstream of said restriction for admitting fuel to the other of said chambers, whereby said piston is subjected on opposite faces to the differential pressure of fuel flowing through said passage means.

4. A fuel control system for an internal combustion engine comprising a control cylinder, a piston rotatable in said cylinder and separating two chambers between the ends of said piston and the ends of said cylinder, one of said chambers having a fuel inlet port and also having a plurality of ports in a wall of said cylinder for the discharge of fuel to the respective cylinders of the engine, said piston having a channel portion providing communication between said inlet port and the respective discharge ports during rotation of said piston, said piston also being translatable in said cylinder to vary the opening of said discharge ports, rotation of said piston being also effective to prevent sticking thereof during translation, fuel supply means comprising a pump having a rotor, means connecting said pump rotor with said piston for imparting rotation to the latter, restricted passage means connected to said pump for supplying fuel to said inlet port, means connected to said passage means upstream of said restriction for admitting fuel to the other of said chambers, whereby said piston is subjected to the differential pressure of fuel flowing through said passage means, and means subject to the differential pressure of air flowing to the engine and connected to said piston.

5. A fuel control system for an internal combustion engine comprising a control cylinder, a piston rotatable in said control cylinder and separating two chambers between the ends of said piston and the ends of said cylinder, one of said chambers having a fuel inlet port and a fuel outlet port, said piston being movable longitudinally in said cylinder to vary the opening of said outlet port, fuel supply means comprising a pump having a rotor, means connecting said rotor with said piston for imparting rotation thereto, and connections from said pump to said cylinder for supplying fuel to said inlet port and subjecting opposite faces of said piston to a fuel differential pressure corresponding to the rate of fuel flow to the engine.

6. A fuel control system for an internal combustion engine comprising a control cylinder, a piston rotatable in said control cylinder and separating two chambers between the ends of said piston and the ends of said cylinder, one of said chambers having a fuel inlet port and a fuel outlet port, said piston being movable longitudinally in said cylinder to vary the opening of said discharge port, fuel supply means comprising a pump having a rotor, means connecting said rotor with said piston for imparting rotation thereto, connections from said pump to said cylinder for supplying fuel to said inlet port and subjecting opposite faces of said piston to a fuel differential pressure corresponding to the rate of fuel flow to the engine, and means connected to said piston and subject to an air differential pressure corresponding to the rate of air flow to said engine.

7. A fuel control system for an internal combustion engine comprising a control cylinder, a pistón rotatable in said control cylinder and separating two chambers between the ends of said piston and the ends of said cylinder, one of said chambers having a fuel inlet port and a fuel outlet port, said piston being movable longitudinally in said cylinnder to vary the opening of said discharge port, fuel supply means comprising a pump having a rotor, means connecting said rotor with said piston for imparting rotation thereto, connections from said pump to said cylinder for supplying fuel to said inlet port and subjecting opposite faces of said piston to a fuel differential pressure corresponding to the rate of fuel flow to the engine, a casing united with said cylinder, movable means in said casing subject on opposite faces to an air differential pressure corresponding to the rate of air flow to the engine, and means connecting said movable means to said piston for imparting movement thereto.

8. A fuel control system for an internal combustion engine comprising a control housing, a piston movable longitudinally in said housing and separating two chambers between the ends of said piston and the ends of said housing, one of said chambers having a fuel inlet port, means comprising an annular recess in said one chamber and a passage communicating therewith for discharging fuel therefrom, one end portion of said piston cooperating with said annular recess in different positions of said piston to regulate the flow of fuel through said discharge passage, and connections to said cylinder for subjecting opposite faces of said piston to the differential pressure of fuel flowing to said piston.

9. A fuel control system for an internal combustion engine comprising a passage for the flow of air to the engine, a control housing having a fuel inlet port and a fuel outlet port, conduit means extending from said outlet port into said air flow passage for discharging fuel into the air stream, a piston movable longitudinally in said housing to vary the flow of fuel through said outlet port, connections to said housing for subjecting opposite portions of said piston to a differential pressure correponding to the rate of flow of fuel to said air stream, movable means subject to an air differential pressure corresponding to the rate of flow of said air stream, means connecting said movable means to said piston, and a pump for supplying fuel to said inlet port and having a rotor connected to said piston for rotating the same.

10. A fuel control system for an internal combustion engine comprising a passage for the flow of air to the engine, a control housing having a fuel inlet port and a fuel outlet port, conduit means extending from said outlet port into said air flow passage for discharging fuel into the air stream, a piston movable longitudinally in said housing to vary the flow of fuel through said outlet port, connections to said housing for subjecting opposite portions of said piston to a differential pressure corresponding to the rate of flow of fuel to said air stream, a casing united to said housing, movable means in said casing, means for subjecting said movable means to an air differential pressure corresponding to the rate of flow of said air stream, means connecting said movable means to said piston, a pump housing united with said piston housing and containing a rotor for supplying fuel to said inlet port, and means connecting said rotor to said piston to impart rotation thereto.

11. A fuel control system for an internal combustion engine, comprising a fuel conduit, a metering restriction in said conduit, a valve for controlling the flow of fuel in said conduit comprising a cylinder and a piston reciprocable and rotatable therein, fluid pressure transmitting connections between the opposite ends of said cylinder and said conduit at the opposite sides of said metering restriction, and a discharge port for one end of said cylinder opening into a lateral wall thereof so that said piston serves as a valve to vary the opening of said port, said piston being formed with a knife edge adjacent said port so that a sudden drop in pressure takes place thru said port and the pressure on the downstream side of the port does not affect the fuel pressure differential tending to move the piston.

12. A fuel system for an internal combustion engine comprising a chamber having a fuel inlet port and a plurality of ports for the discharge of fuel to the respective cylinders of said engine, rotary means in said chamber for controlling the total fuel flow through said chamber and for distributing the fuel to said discharge ports, said rotary means being mounted for translatory movement in said chamber to vary the opening of said discharge ports and thereby control the total fuel flow, rotation of said rotary means being effective to prevent sticking thereof during translatory movement and to connect said discharge ports successively to said inlet port and thereby distribute fuel to said discharge ports, and means for subjecting opposite portions of said rotary means to a differential fuel pressure corresponding to the rate of flow of fuel to the engine.

13. A fuel control system for an internal combustion engine as in claim 12, including means subject to a differential air pressure corresponding to the rate of flow of air to the engine and connected to said rotary means so that said differential air pressure acts in opposition to said differential fuel pressure.

14. A fuel control system for an internal combustion engine comprising a control cylinder, a piston translatable in said cylinder and separating two chambers between the ends of said piston and the ends of said cylinder, one of said chambers having a fuel inlet port and also having a fuel discharge port in a side wall thereof, a portion of said piston adjacent the periphery of one end thereof cooperating with said discharge port to vary the opening thereof as said piston is translated in said cylinder, a conduit for fuel flowing to said engine, a metering restriction in said conduit, a connection between said conduit on one side of said restriction and said inlet port, and a connection between said conduit on the opposite side of said restriction and the other of said chambers, so that opposite faces of said piston are subjected to the fuel pressure differential across said restriction and said fuel pressure differential acts on said piston in a direction to decrease the flow thru said restriction.

15. A fuel control system for an internal combustion engine as in claim 14, in which said piston is also rotatable in said cylinder, and including means for continuously rotating said piston to prevent sticking during translation thereof.

16. A fuel control system for an internal combustion engine, as in claim 15, including means for applying to said piston a force opposing said fuel pressure differential and varying in accordance with the rate of flow of air to the engine.

17. A fuel control system for an internal combustion engine as in claim 15, in which said discharge port comprises an annular recess in the side wall of said one chamber.

18. A fuel control system for an internal combustion engine as in claim 15, in which said one chamber has a row of discharge ports in the side wall thereof for the discharge of fuel to the respective cylinders of the engine, and said piston has a lateral slot extending from said one end thereof to successively provide communication between said inlet port and the respective discharge ports during rotation of said piston.

19. A fuel control system for an internal combustion engine as in claim 15, in which said piston is formed with a knife edge adjacent said port so that a sudden drop in pressure takes place thru said port and the pressure on the downstream side of the port does not affect the fuel pressure differential tending to move the piston.

LEIGHTON LEE, II.

REFERENCES CITED

The following references are of record in the file of this patent:

UNITED STATES PATENTS

| Number | Name | Date |
| --- | --- | --- |
| 1,597,787 | Hausser et al. | Aug. 31, 1926 |
| 1,802,848 | Summers | Apr. 28, 1931 |
| 2,126,709 | Alden | Aug. 16, 1938 |
| 2,330,650 | Weiche | Sept. 28, 1943 |
| 2,403,866 | Lipfert | July 9, 1946 |